Figure 1:
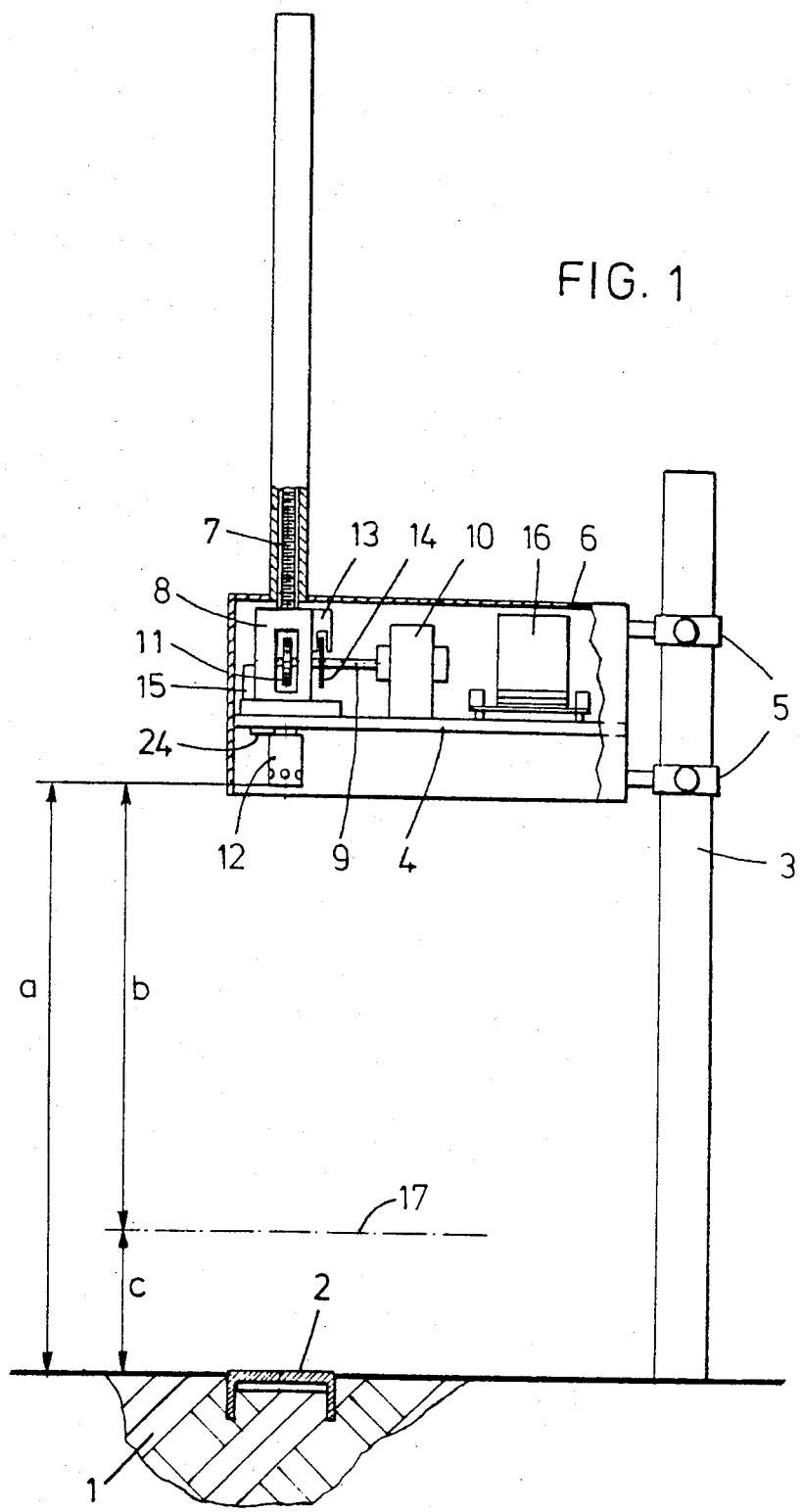

United States Patent [19]

Boschung et al.

[11] Patent Number: 4,600,842
[45] Date of Patent: Jul. 15, 1986

[54] SNOWFALL MEASURING METHOD AND APPARATUS

[75] Inventors: Marcel Boschung, Schmitten; Beat Schmutz, Düdingen, both of Switzerland

[73] Assignee: Boschung Mecatronic AG, Canton of Fribourg, Switzerland

[21] Appl. No.: 455,644

[22] Filed: Jan. 5, 1983

[30] Foreign Application Priority Data

Jan. 15, 1982 [CH] Switzerland ............... 245/82

[51] Int. Cl.⁴ ............................................. E01N 21/85
[52] U.S. Cl. ..................................... 250/577; 73/293
[58] Field of Search ............... 250/577, 222.1, 222.2; 340/601, 612; 73/293, 290 R, 290 V, 295, 292, 298; 33/125 A, 1 H, 126.7; 356/381, 384

[56] References Cited

U.S. PATENT DOCUMENTS

| | | | |
|---|---|---|---|
| 1,664,265 | 7/1928 | Reiber | 33/126.7 A |
| 2,683,371 | 7/1954 | Droin et al. | 73/290 R |
| 2,906,026 | 9/1959 | Hannes | 33/126.7 A |
| 3,428,815 | 2/1969 | Thompson | 250/222.1 |
| 3,530,453 | 9/1970 | Rossier . | |
| 3,631,526 | 12/1971 | Brunton | 250/341 |
| 3,872,598 | 3/1975 | Bachner et al. | 33/169 R |
| 4,056,887 | 11/1977 | Tucker et al. | 73/295 |

FOREIGN PATENT DOCUMENTS

| | | | |
|---|---|---|---|
| 1207103 | 12/1965 | Fed. Rep. of Germany | 250/577 |
| 0072064 | 5/1982 | Japan | 250/222.1 |

*Primary Examiner*—David C. Nelms
*Assistant Examiner*—James Gatto
*Attorney, Agent, or Firm*—Dann, Dorfman, Herrell & Skillman

[57] ABSTRACT

A probe is fixed to a vertically displaceable rack. Under the probe is a reference plate freely exposed to snowfall. The probe is periodically lowered toward the reference plate and stopped when it encounters either the plate or a layer of snow which has fallen on the plate. With the aid of a light barrier and a perforated disk, electrical signals dependent upon the distance travelled by the probe are generated and transmitted to an evaluating device. This device calculates, on the basis of the signals received, the difference between the aforementioned distance travelled and the distance from the reference plate to the probe in its uppermost position. This difference corresponds to the thickness of the deposit of snow on the plate. For subsequent measurements, a new reference value corresponding to the surface of the snow already lying on the plate can be used for the calculation. Hence there is no need for clearing the plate of snow after each alarm signal.

20 Claims, 9 Drawing Figures

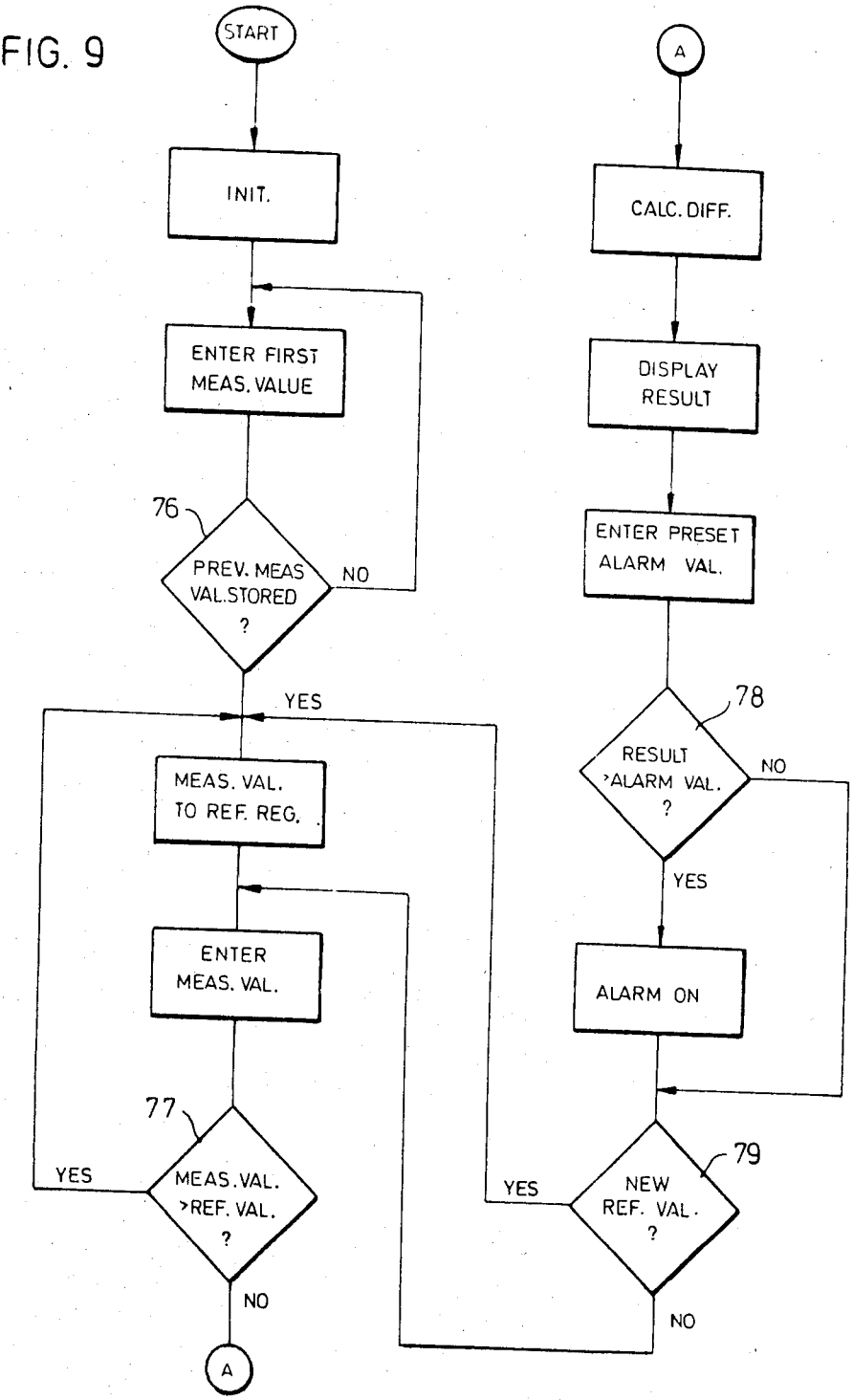

SNOWFALL MEASURING METHOD AND APPARATUS

This invention relates to methods and apparatus for measuring the fall of snow, and more particularly to a method and apparatus for measuring the thickness of a covering of snow which has accumulated on a reference plate exposed to the free snowfall.

Snowfall warning apparatus for monitoring newly fallen snow is described in U.S. Pat. No. 3,530,453. This apparatus, which transmits a signal as soon as an adjustable level of snow has been reached, comprises a rigidly disposed light barrier with a light source and a photocell, as well as a table which can be adjusted in height relative to the light barrier. For instance, when the table is set so that its surface is 3 cm. below the light barrier, and the amount of snow which has fallen on the table is sufficient to cause the light barrier to respond, a warning signal is set off. This prior art warning device operates very satisfactorily, except that if another warning signal is supposed to be triggered by a further snowfall, the table must either be cleared of snow or set farther down. This means that someone must go outdoors to where the apparatus is set up. Moreover, this previously disclosed warning apparatus does not give the alarm until the snow has already reached a predetermined level. It is not possible to ascertain the start of the snowfall.

It is an object of this invention to provide a method and apparatus wherein it is not necessary to clear away the accumulated snow after every snowfall.

A further object of this invention is to provide a method and apparatus whereby the start of a snowfall can be indicated.

To this end, in the method according to the present invention, of the type initially mentioned, a probe is lowered from a specific rest position onto the reference plate, the downward movement of the probe is stopped upon its encountering the reference plate or the surface of the covering of snow, the distance travelled by the probe is determined, the thickness of the covering of snow is calculated with the aid of the determined distance, and the probe is returned to its rest position after the stopping of the downward movement.

The apparatus according to the present invention for carrying out the foregoing method comprises a probe disposed above the reference plate, a device for guiding the probe along a path leading to the reference plate, a drive device for moving the probe from a specific rest position along the path, a device for stopping and switching over the drive device when the probe encounters the reference plate or the covering of snow, means for generating electric signals as a function of the distance travelled by the probe from the rest position downward, an evaluation device for determining the distance travelled and for calculating the thickness of the covering of snow with the aid of that distance, and a device for displaying the calculated level of the covering of snow.

Figure 2:
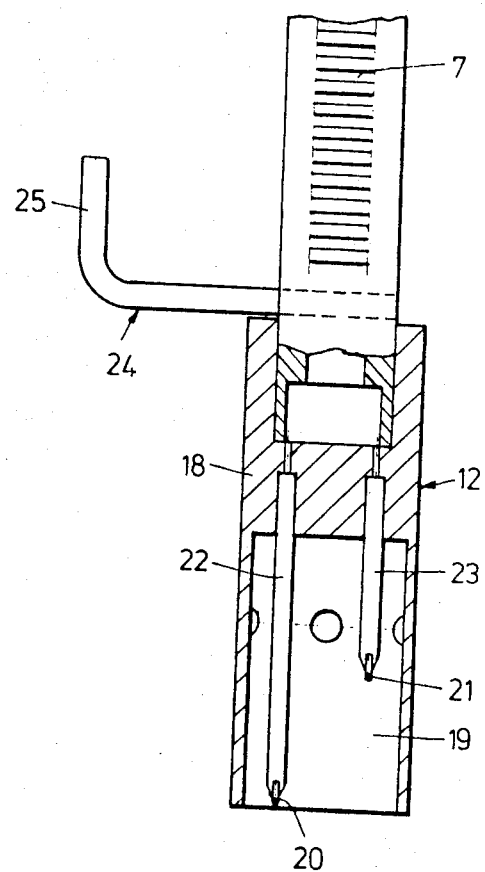
Figure 3:
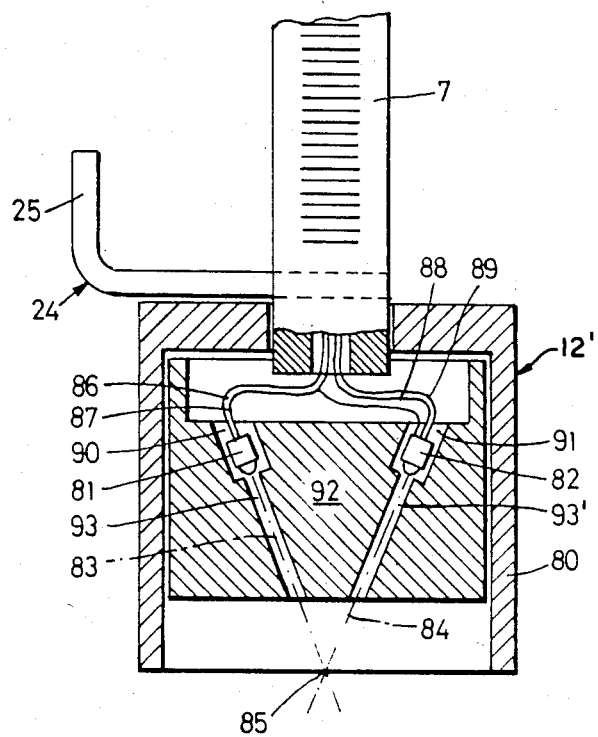
Figure 4:
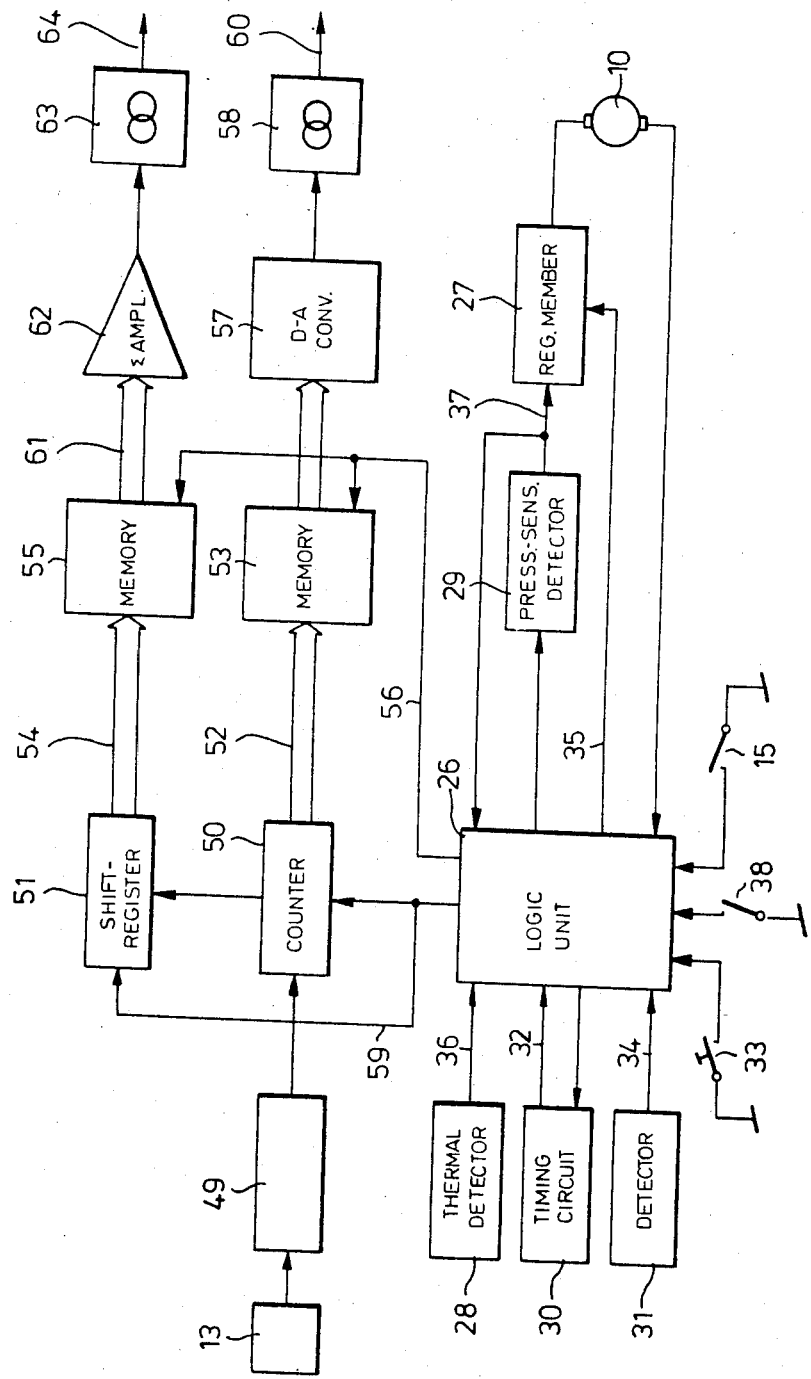
Figure 5:
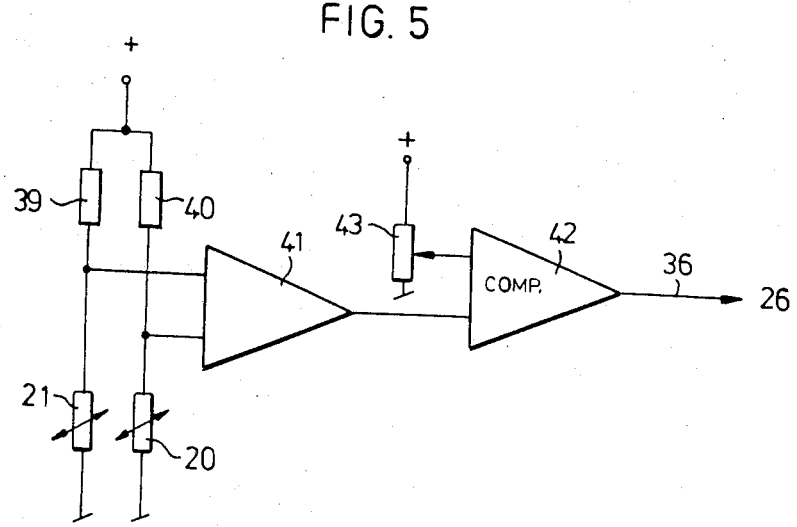
Figure 7:
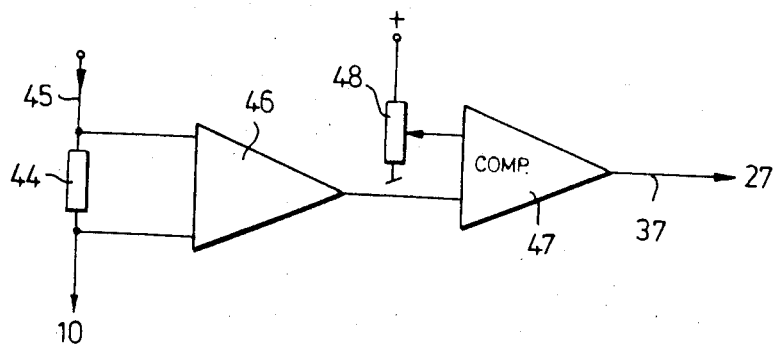
Figure 6:
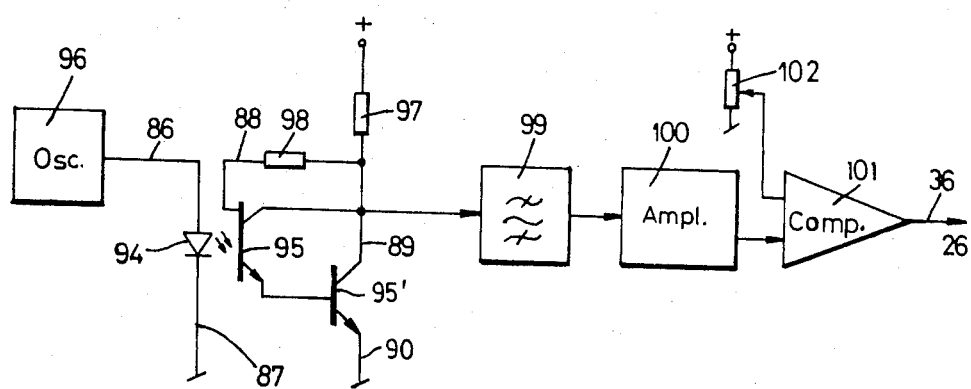
Figure 8:
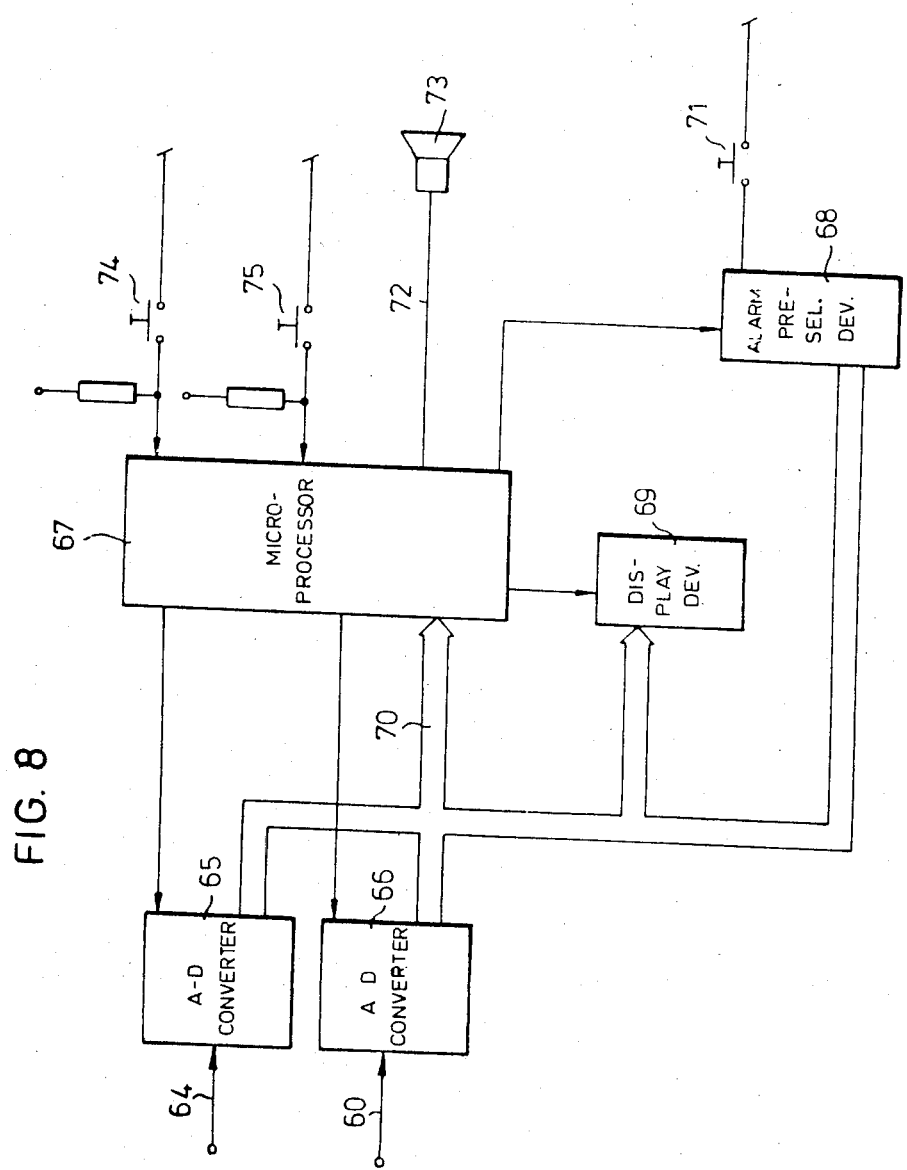

Preferred embodiments of the invention will now be described in detail with reference to the accompanying drawings, in which: FIG. 1 is a diagrammatic side view of the transmitting portion of the apparatus according to the invention in one embodiment, FIG. 2 is a section through a thermosensitive probe of the apparatus of FIG. 1, FIG. 3 is a section through a photosensitive probe of the apparatus of FIG. 1, FIG. 4 is a block diagram of the transmitter part of the apparatus, FIG. 5 is a diagram of a circuit for generating a detection signal as a function of the thermosensitive probe of FIG. 2, FIG. 6 is a diagram of another circuit for generating a detection signal as a function of the photosensitive probe of FIG. 3, FIG. 7 is a diagram of a circuit for generating a further detection signal as a function of mechanical pressure exerted upon the probe, FIG. 8 is a block diagram of the receiver part of the apparatus in an embodiment of the invention, and FIG. 9 is a flow chart showing the mode of operation of the receiver part.

FIG. 1 shows the transmitting portion of apparatus according to the invention in one embodiment. A reference plate 2 is inset into the ground 1. Secured by clamps 5 to a post 3 anchored in the ground 1 is a mounting plate 4 disposed in a housing 6 which is open at the bottom and shown only in outline.

Extending through housing 6 and plate 4 is a rack 7, preferably disposed vertically. Rack 7 is displaceably mounted in a bearing block 8 secured to plate 4. Extending transversely through block 8 is a drive shaft 9 to be driven by a motor 10, preferably equipped with a step-down transmission. A pinion 11 engaging the teeth of rack 7 is fixed to shaft 9 for rotation therewith, so that rack 7 can be moved up or down depending upon the direction of rotation of motor 10. Disposed at the lower end of rack 7 is either a probe 12 responding to temperature differences or a probe 12' responding to reflected light, which probes will be described in detail below with reference to FIGS. 2 and 3, respectively. Means for generating electric signals as a function of the sliding movement of probe 12, i.e., of rack 7, comprise a light sensor 13 secured to bearing block 8 and a perforated disk 14 fixed to drive shaft 9 for rotation therewith. Light sensor 13 might instead be disposed in such a way that the teeth of rack 7 extend through the sensor, in which case disk 14 could be dispensed with. As the perforations in the disk or the teeth of the rack pass through the sensor, pulses are produced.

Also disposed on bearing block 8 is a limit switch 15 which turns off motor 10 when rack 7 has returned upwardly from below to its starting or rest position. An electronic control unit 16 having a device for stopping and switching over motor 10 during the downward movement of probe 12 is mounted on plate 4. This device will be described in detail below with reference to FIG. 4.

Mounting plate 4 is secured to post 3 in such a way that the lower end of probe 12 in its uppermost or rest position is spaced from the surface of reference plate 2 by a vertical distance a. When probe 12 is lowered by distance b, it encounters the blanket of snow indicated by dot-dash line 17 and is stopped. The distance b travelled by probe 12 is determined from the signals produced by light barrier 13 with the aid of an evaluation device to be described below, and the thickness c of the layer of snow lying on reference plate 2 is calculated by taking the difference between distances a and b.

The transmitting part described above is so arranged and constructed so compactly that it has practically no influence upon the free fall of snow onto reference plate 2.

FIG. 2 is a section through probe 12 disposed at the lower end of rack 7, shown in part. Probe 12 comprises a protective casing 18, preferably of plastic, surrounding a chamber 19, open at the bottom and accommodating two temperature sensors 20 and 21. One of these sensors, viz., contact sensor 20, is situated directly adjacent to the bottom of casing 18, while the other temperature sensor, viz., reference sensor 21, is situated in the middle of chamber 19 upwardly remote from the bottom. Both temperature sensors 20 and 21 have an extremely small time constant; in operating condition they are self-heated to about 10 degrees Celsius higher than the ambient temperature and are thus exposed to substantially identical absolute temperatures. These temperature sensors are preferably NTC or PTC resistors through which a relatively large current flows during operation for heating purposes.

When probe 12 is lowered, contact sensor 20 touches the snow to be measured first, and because of the appreciable loss of heat sensor 20 becomes cooler than reference sensor 21. In accordance with the differing temperatures to which sensors 20 and 21 are exposed, differing electrical potentials occur at these temperature sensors, and these voltages are supplied to electronic control unit 16 over wires (not shown) running through supports 22 and 23 holding sensors 20 and 21, respectively.

Immediately above protective casing 18, a bent rod 24 is fixed to or in rack 7. The upwardly bent end 25 of rod 24 actuates limit switch 15 when probe 12 returns to its rest position.

Instead of the probe 12 illustrated in FIG. 2, a probe 12' shown in section in FIG. 3 may preferably be used. In a cup-shaped case 80 secured to the lower end of rack 7, an infrared emitter 81 and an infrared receiver 82 are disposed. The optical axes 83 and 84 of IR emitter 81 and IR receiver 82, respectively, run at an angle to one another and intersect the plane defined by the bottom rim of case 80 at a common point 85. Connecting wires 86 and 87 for emitter 81 and connecting wires 87, 88 and 89 for receiver 82 pass through the hollow rack 7 and are connected to control unit 16. IR emitter 81 and IR receiver 82 are held in respective recesses 90 and 91 in a block 92 fixed in case 80. Within block 92, passages 93 and 93' extend obliquely downward from recesses 90 and 91 along the respective optical axes 83 and 84. Block 92 is of an opaque material such as metal or plastic.

When there is no snow beneath case 80, the rays emitted by IR emitter 81 pass out of case 80, and no radiation reaches IR receiver 82. If case 80 is lowered down to the surface of a deposit of snow, then there is snow at point 85, and a large part of the radiation emitted by emitter 81 is reflected to receiver 82. The mode of operation of probe 12' will be described below in connection with FIG. 6.

FIG. 4 is a block diagram of the transmitter part, i.e., of electronic control unit 16. This control unit has a control portion for controlling motor 10 and a converter portion for converting the distance travelled by the probe into electric signals. The motor 10 is reversible so that in one mode it operates to lower the probe and in the other mode it operates to raise the probe. The control portion comprises a logic unit 26, a regulating element 27 for turning motor 10 off and on and for determining its direction of rotation, a thermal detector 28 electrically connected to temperature sensors 20 and 21, a detector 29 responsive to pressure exerted upon the probe, a timing circuit 30, and a detector 31 responsive to the air temperature. At adjustable intervals, e.g., every 5 to 60 min., timing circuit 30 transmits a start pulse to logic unit 26 over a wire 32. By way of exception, a start pulse may be transmitted to unit 26 by means of a start button 33 instead. Detector 31, responsive to the air temperature, generates an inhibiting signal whenever the air temperature is over about 5° C. or 41° F., for instance. The inhibiting signal is supplied to logic unit 26 over a wire 34. When the start pulse arrives at unit 26, and provided there is no inhibiting signal, regulating element 27 is put into condition via a signal on a wire 35 such that motor 10 rotates in the direction whereby probe 12 is lowered.

If the start pulse is given by means of start button 33, motor 10 is switched on even when detector 31, responsive to the air temperature, transmits an inhibiting signal to logic unit 26. This makes it possible to check the operation of the apparatus.

If probe 12 encounters the surface of the snow when lowered, thermal detector 28 generates a stop signal which is supplied to logic unit 26 over a wire 36. When the stop signal arrives at unit 26, the latter changes the condition of regulating element 27 in such a way that element 27 reverses the polarity of the voltage supplied to motor 10, so that the motor first stops, then rotates in the opposite direction. This causes probe 12 to be moved back into its rest position.

If probe 12 encounters resistance when lowered, because it has reached either a frozen crust of snow or the snow-free reference plate 2 itself, and the thermal detector has not generated a stop signal, the pressure-sensitive detector 29 responds instead of thermal detector 28 and likewise generates a stop signal which is supplied over a wire 37 directly to regulating element 27 for stopping and switching over motor 10. The stop signal generated by detector 29 is simultaneously supplied to logic unit 26 as well.

In exceptional cases, a stop signal can also be given by means of a stop button 38.

FIG. 5 shows a design of thermal detector 28. Contact sensor 20 and reference sensor 21 of probe 12 are NTC or PTC resistors, each connected across respective resistors 39 and 40 to a voltage source designated as +. The connection point between resistor 39 and reference sensor 21 is connected to the first input of a differential amplifier 41, and the connection point between resistor 40 and contact sensor 20 is connected to the second input of differential amplifier 41. The output of amplifier 41 is connected to one of the inputs of a comparator 42. A reference voltage tapped from a potentiometer 43 is applied to the other input of comparator 42.

The output of comparator 42 is connected to a wire 36 which conveys the output signal of that comparator, which is the aforementioned stop signal, to logic unit 26. As long as contact sensor 20 and reference sensor 21 are exposed to the same temperature, differential amplifier 41 does not generate any signal, nor is there any stop signal at the output of comparator 42. However, when contact sensor 20 comes in contact with snow, it is cooled down, and an output voltage appears at the output of amplifier 41. As soon as this output voltage exceeds the reference voltage adjustable on potentiometer 43, comparator 42 generates the stop signal at its output.

Instead of thermal detector 28, it is possible to use a reflection detector as diagrammed in FIG. 6. This reflection detector comprises IR emitter 81 and IR receiver 82, shown in FIG. 3. Emitter 81 takes the form of a lightemitting diode 94 (FIG. 6), while receiver 82 is a Darlington circuit containing a phototransistor 95 (FIG. 6). In order to make the reflection detector insensitive extraneous light, the infrared light emitted by LED 94 is modulated, i.e., LED 94 is fed by an oscillator 96 which generates rectangular pulses having a predetermined pulse frequency. The rectangular pulses are supplied to LED 94 over a connecting wire 86, and the other connecting wire 87 is connected to ground. When there is snow at the above-mentioned point 85, the modulated rays are reflected to phototransistor 95 of the Darlington circuit, which is powered over a connecting wire 89 across a collector resistor 97. The emitter of a transistor 95' of the Darlington circuit is grounded over a connecting wire 90, while the base of phototransistor 95 is biased across a resistor 98 and a connecting wire 88. At the connection point of the collectors of the two transistors and collector resistor 97 there appears a voltage proportional to the modulated photo-electric current, which voltage is supplied to a band-pass filter 99.

The middle frequency of filter 99 corresponds to the pulse-train frequency, and the AC voltage signals filtered out are then amplified in an amplifier 100. The output of amplifier 100 is connected to one of the two inputs of a comparator 101. A reference voltage tapped from a potentiometer 102 is applied to the other input. As soon as the output voltage of amplifier 100 is higher than the reference voltage, comparator 101 generates at its output the stop signal which reaches logic unit 26 over wire 36.

FIG. 7 shows a design of pressure-sensitive detector 29. An ohmic resistor 44 having a relatively low resistance forms part of the circuit of motor 10, represented by a wire 45. The two terminals of resistor 44 are connected to respective inputs of a differential amplifier 46. The output of amplifier 46 is connected to one input of a comparator 47, while the other input of this comparator is connected to the tapping of a potentiometer 48. The output of comparator 47 is connected to a wire 37 which supplies the output signal, viz., the above-mentioned stop signal, to regulating element 27 and to logic unit 26. The reference voltage tapped from potentiometer 48 is higher than the output voltage of amplifier 46 when motor 10 drives rack 7 without the latter's being impeded. If rack 7, i.e., probe 12 or 12', encounters resistance from a firm obstacle, the load on motor 10 is greater, the current flowing through motor 10 increases, and thus the output voltage of differential amplifier 46 becomes higher. This output voltage exceeds the reference voltage, and comparator 47 generates the stop signal.

Besides the control portion described earlier, the control unit 16 diagrammed in FIG. 4 also comprises the converter shown in the upper half of that drawing figure for converting the electrical signals dependent upon the distance travelled by probe 12 or 12'. The pulses produced by light sensor 13 are shaped and amplified in a pulse shaper 49. The amplified pulses then reach a counter 50, one pulse being generated for each millimeter of displacement of rack 7, for example. Counter 50 may be an 8-bit binary counter, the first 127 counting steps of which are used. Each time counter 50 overflows, i.e., whenever rack 7 has been lowered over a distance of 128 mm., one bit is entered in a shift register 51 having a capacity of 8 bits, for instance.

The count of counter 50 is transferred in parallel over a multiple line 52 to a memory 53, and the data stored in shift register 51 are transferred over a multiple line 54 to a second memory 55; they are entered in these memories when the memories receive an enter signal from logic unit 26 over a wire 56. Logic unit 26 generates the enter signal after the stop signal has been produced by either the thermal detector 28 or the pressure-sensitive detector 29.

Counter 50 is reset, and the data in shift register 51 are erased, whenever a reset signal is supplied to counter 50 and shift register 51 over a wire 59. The reset signal is generated by logic unit 26 when limit switch 15 is actuated, i.e., when probe 12 has returned to its rest position. The outputs of memory 53 are connected to a digital-to-analog converter 57 which generates an analog voltage signal as a function of the stored count. By means of this signal, a controllable current source 58 delivers a specific current to an output line 60 for each value of the analog voltage signal.

The controllable range of current source 58 is from 0 to 5 mA, for example. When counter 50 is at zero, no current is delivered to output line 60 by current source 58; and when the count is 128—meaning that probe 12 has been lowered 128 mm. (about 5") or a multiple thereof—current source 58 delivers a current of 5 mA to output line 60. In other words, the current delivered by current source 58 increases by, in round numbers, 39 microamps per millimeter of displacement of rack 7.

For determining by how many whole multiples of 128 mm. probe 12 has been lowered, a bit is entered in shift register 51 every time counter 50 overflows, as mentioned above. The outputs of the storage locations of shift register 51 are connected over a multiple line 61 to a summing amplifier 62. By means of the output voltage of amplifier 62, a second current source 63 is triggered, which delivers a current between 0 and 4.8 mA to a second output line 64 as a function of the number of bits stored in shift register 51 and memory 55. If there is no bit entered in memory 55, current source 63 does not deliver any current; and for each whole multiple of 128 mm. of distance travelled by probe 12, the current delivered by current source 63 is increased by 0.6 mA. If, for example, a current of 3.6 mA is flowing in output line 64 and a current of 2.5 mA in output line 60, this means that probe 12 has been lowered by 6×128 mm. +64 mm. =832 mm. Thus, if the distance a between the lower end of probe 12 and reference plate 2 were 1000 mm., this would mean that the blanket of snow is 1000 mm.−832 mm.=168 mm. or close to 7" thick.

The count of counter 50 is stored in memory 53, and the data in shift register 51 are stored in memory 55, until a new enter signal is supplied to these memories 53 and 55 at the time of the next monitoring interval. Accordingly, the respective currents flow in the two output lines 60 and 64 until a new monitoring interval is initiated by timing circuit 30.

Output lines 60 and 64 as shown in FIG. 8, lead to a receiver part of the apparatus, which may be close to or remote from the transmitter part and which comprises two analog-to-digital converters 65 and 66, an evaluating device in the form of a microprocessor 67, an alarm preselection device 68, and a display device 69. A-D converter 65 converts the analog current arriving on line 64 into a digital value, which in the present example corresponds to a whole-number multiple of 128 mm. This digital value is entered in microprocessor 67 over a data bus 70. A-D converter 66 converts the analog current arriving on line 60 into a digital value, which in the present example corresponds to a value from 0 to 127 mm. This digital value is likewise entered in microprocessor 67 over data bus 70.

From these digital values, microprocessor 67 calculates the thickness of the blanket of snow with the aid of a digital reference value. The calculated data concerning the depth of the snow are supplied over data bus 70 to display device 69, which displays them directly in a unit of length, e.g., millimeters, centimeters, or inches. By means of a setting button 71, alarm preselection device 68 can be present to a desired depth of snow so that when that depth is reached, an alarm goes off. The respective preselection data are conveyed via data bus 70 from alarm preselection device 68 to display device 69, for displaying the preselected depth, and to microprocessor 67, for generating the alarm signal, when the calculated thickness of the layer of snow reaches or exceeds the preselected depth. The alarm signal is conveyed over a wire 72 to an acoustical and/or optical alarm device 73. The acoustical alarm can be suppressed by means of a switch 74.

By actuating another button 75, microprocessor 67 is influenced in such a way that the subsequent calculations are based upon the difference between distance a and the last-calculated depth of the snow as the new reference value. This makes it possible to determine the thickness of a further deposit of snow which has fallen upon the first one. Hence it is not necessary to clear the snow off reference plate 2 after every alarm.

In many cases a rough indication of the depth of the snow is sufficient. For instance, light barrier 13 may be designed to generate a pulse only every 5 mm. of the distance by which probe 12 or 12' is lowered. In this case, the construction of the converter portion, for converting the distance travelled by probe 12 or 12' into electrical signals, and of the receiver portion can be much simpler. The converter portion shown in the upper half of FIG. 4 then contains merely counter 50, memory 53, digital-to-analog converter 57, and controllable current source 58. Shift register 51, memory 55, summing amplifier 62, and controllable current source 63 are eliminated. The receiver part shown at the left-hand side of FIG. 8 then comprises only analog-to-digital converter 66. Because only current source 58 and the one converter 66 are left, only the one output line 60 is needed.

If an 8-bit binary counter is used as counter 50, as mentioned above, and if the controllable range of current source 58 is 0–5 mA, for example, probe 12 or 12' can be lowered by, say, 635 mm. This distance is the product of the number of counting steps of counter 50 (127) times the number of millimeters per counting step (5 mm.), i.e., $127 \times 5$ mm. $= 635$ mm. Accordingly, current source 58 delivers a current of 5 mA when probe 12 or 12' has been lowered by 635 mm. This means that the current delivered by current source 58 increases by 39 microamps per 5 mm. of extended length.

In the receiver part, FIG. 8, according to the current on line 60, this analog value is converted by A-D converter 66 into a digital value and supplied over data bus 70 to microprocessor 67.

FIG. 9 is the flow chart according to which the respectively programmed microprocessor 67 operates. Microprocessor 67 may be a simple 8-bit microprocessor of type Z8. After the start, initializing takes place. A first measured value, i.e., the sum of the digital values from A-D converters 65 and 66, is entered in a first memory of microprocessor 67. This first measured value corresponds, for example, to distance a between the bottom of probe 12 and reference plate 2 because there is not yet any snow on plate 2. A decision point 76 checks whether a measured value had already been stored previously. If not, a second measured value is read into the memory; if no snow has yet fallen on the reference plate, this second measured value will correspond to the first one. After the second measured value has been entered in the memory, decision point 76 ascertains that a measured value is already stored and causes the first-stored measured value to be stored as a reference value in a reference register of microprocessor 67.

Another decision point 77 checks whether the last-entered measured value is greater or less than the reference value. If the last-entered value is equal to or greater than the reference, the next measured value is in turn read in and once more compared with the reference value. This operation is periodically repeated every 10 to 60 seconds until the next measured value changes, i.e., become less. Upon comparison with the reference value, decision point 77 then ascertains that the last-entered measured value is no longer equal to or greater than the reference value, but less than that value. Decision point 77 thereupon causes the difference between the reference value and the last-entered measured value to be calculated and to be displayed by display device 69.

Alarm preselection device 68 is next interrogated as to what value has been preset by means of button 71. This preselected alarm value, i.e., the thickness of the blanket of snow at which the alarm is supposed to be set off, is introduced into another memory of microprocessor 67. A further decision point 78 checks whether the result of the calculation, i.e., the thickness of the layer of snow actually lying upon reference plate 2, is more or less than the preselected alarm value. If decision point 78 determines that the calculated result is not greater than the preselected alarm value, another decision point 79 intervenes to check whether a new reference value ought to be taken into consideration. If not, decision point 79 causes the next measured value to be newly read in, and the operation described above is repeated. If decision point 79 determines that a new reference value ought to be taken into consideration, which instruction can be given by actuating button 75, decision point 79 causes the next measured value to be entered and stored in the reference register.

If decision point 78 ascertains that the calculated result is greater than the preselected alarm value, it initiates the generating of an alarm signal whereby an optical and/or acoustical alarm is set off. Thereafter, if no new reference value is required, the next measured value is further processed as stated above.

The apparatus first described above is capable of surely and reliably detecting a snowfall of only 1 mm. in depth (about 4/100 of an inch). This makes it possible for the foreman of a snow-clearance squad to find out when it begins to snow by setting alarm preselection device 78 to a depth of 1 mm. by means of button 71. As soon as 1 mm. of snow has fallen, the foreman will be warned by the apparatus that it has started to snow. The foreman can then set the alarm to go off at whatever depth of snow he considers the proper one for beginning snowclearance operations, e.g., 40 mm. or 1½ inches. When the snow then reaches that depth, the foreman is again alerted, and he can initiate the clearance operations. After the streets have been cleared of snow, the foreman actuates button 75. The last measured value is thereby taken over as the new reference value, and the procedure described above can recommence without any necessity of first clearing the snow off reference plate 2.

If, on the other hand, it does not continue to snow hard, or even stops snowing, after the first start-of-snowfall alarm and resetting of the alarm value, then no further alarm will be given.

When there is already a deposit of snow on reference plate 2 and this layer becomes thinner owing to its own weight or to thawing, sunshine, or rain, a new reference value adapted to the changed conditions can be entered in the reference register at any time by actuating button 75, so that subsequent measurements relate to this new reference value.

The apparatus operates reliably under all snow conditions, for as long as the snow is soft, probe 12 responds to the temperature difference ascertained by temperature sensors 20 and 21, or probe 12' to the reflection of light caused by the snow, and when there is a hard crust on the snow, pressure-sensitive detector 29 responds.

What is claimed is:

1. Apparatus for measuring the thickness of a layer of fallen snow deposited on a reference plate exposed to the free fall of snow, comprising:
    a probe disposed at a rest position above said reference plate, said probe having means to generate a first stop signal when the probe encounters the surface of said layer and a second stop signal when the probe encounters a firm obstacle,
    means for guiding said probe along a path leading from said rest position to said reference plate,
    drive means with a regulating element operable in a first condition for moving said probe downward along said path from said rest position of said probe, and operable in a second condition to return said probe to said rest position,
    means for stopping and switching over said drive means regulating element from said first condition to said second condition when said probe encounters either said reference plate or said layer of fallen snow and generates either of said stop signals,
    means for generating electrical signals as a function of the downward distance travelled by said probe along said path,
    evaluating means receiving said electrical signals and operable for determining said distance and for calculating said thickness of said layer of fallen snow on said reference plate, and
    means for recording the calculated thickness.

2. The apparatus of claim 1, further comprising pressure-sensitive detector means for generating said second stop signal stopping the downward movement of said probe when said probe encounters a firm obstacle.

3. The apparatus of claim 1, wherein said probe comprises a protective casing having an open bottom, two thermosensitive elements disposed within said casing, and support means for each of said thermosensitive elements mounting one of said thermosensitive elements adjacent to said bottom of said casing and mounting the other of said thermosesntive elements within said casing upwardly remote from said bottom.

4. The apparatus of claim 1, wherein said probe comprises a protective casing having an open bottom and a bottom rim, an infrared emitter, and an infrared receiver, said emitter and said receiver being mounted within said casing so that the respective optical axes of said emitter and said receiver intersect at a point situated within a plane defined by said bottom rim of said casing.

5. The apparatus of claims 1, wherein said means for guiding said probe comprises a bearing block and a rack vertically displaceable in said bearing block, said drive means comprising an electric motor having a reduction gear and a drive shaft extending into said bearing block, and a pinion mounted on said drive shaft for rotation therewith and engaging said rack.

6. The apparatus of claim 5, wherein said means for generating electrical signals comprises a perforated disk mounted on said drive shaft for rotation therewith, and a light sensor receiving the perforated part of the disk and operable to generate pulses in response to the rotation of the perforated disk therethrough.

7. The apparatus of claim 1, wherein said evaluating means comprises a microprocessor programmed to calculate from said electrical signals the thickness of said layer of fallen snow deposited on said reference plate.

8. The apparatus of claim 7, further comprising means for transmitting said electrical signals, including:
    a light sensor to generate one pulse in response to a selected increment of downward displacement of said probe,
    a counter for counting pulses generated by said light sensor during downward movement of said probe,
    a memory for storing the count of said counter upon stopping of said probe,
    a digital-to-analog converter for converting the said digital counter into an analog control voltage,
    a controllable current source for supplying a current dependent upon said control voltage,
    an analog-to-digital converter for converting the value of said current into a digital value processable by said microprocessor, and
    an output line for carrying said current from said current source to said analog-to-digital converter.

9. The apparatus of claim 1, wherein said drive means comprises a motor and said regulating element includes a circuit for powering said motor, said means for stopping and switching over said drive means regulating element comprising a resistor disposed in said circuit and having two terminals, a differential amplifier having an output and two inputs respectively connected to said two terminals, a comparator having two inputs, and means for applying a reference voltage to one of said comparator inputs, the other one of said comparator inputs being connected to said differential amplifier output.

10. The apparatus of claim 9, wherein said probe comprises a protective casing having an open bottom, two thermosensitive elements disposed within said casing, and support means for each of said thermosensitive elements mounting one of said elements adjacent to said bottom of said casing and mounting the other of said elements within said casing upwardly remote from said bottom.

11. The apparatus of claim 9, wherein said probe comprises a protective casing having an open bottom and a bottom rim, an infrared emitter, and an infrared receiver, said emitter and said receiver being mounted within said casing so that the respective optical axes of said emitter and said receiver intersect at a point situated within a plane defined by said bottom rim of said casing.

12. A method of measuring the thickness of a layer of fallen snow deposited on a reference plate exposed to the free fall of snow, comprising the steps of:

providing a probe at a rest position above the reference plate so as not to interfere with the free fall of snow onto said plate, lowering a probe from said rest position toward the reference plate, stopping the downward movement of the probe upon its encountering the surface of the layer of snow on the plate, or if there is no snow, upon encountering the plate, determining the downward distance travelled by the probe, calculating the thickness of the layer of snow as a function of the distance determined, and returning the probe to its rest position after stopping of the downward movement.

13. The method of claim 12, further comprising the steps of converting the distance travelled by the probe into electrical measurement signals and supplying these signals to an evaluating device disposed remote from the probe for determining the distance travelled by the probe and for calculating the thickness of the layer of snow.

14. The method of claim 12, further comprising the steps of storing the downward distance travelled to encounter the surface of the deposited layer of snow, at a later time lowering the probe a second time from its rest position, stopping it upon encountering the surface of subsequently deposited snow, and then returning it to its rest position, determining the downward distance travelled by the probe the second time and comparing it to the stored distance for calculating the thickness of any layer of snow subsequently deposited on said plate.

15. The apparatus of claim 1 wherein said probe, guide means and drive means are constructed and arranged so that they do not substantially interfere with the free fall of snow onto said reference plate.

16. Apparatus for measuring the thickness of a layer of fallen snow deposited on a reference plate exposed to the free fall of snow, comprising:

a probe disposed at a rest position above said reference plate, said probe comprising a protective casing having an open bottom and a bottom rim, an infrared emitter and an infrared receiver, said emitter and receiver being mounted within said casing so that the respective optical axes of said emitter and receiver intersect at a point situated within a plane defined by said bottom rim of said casing, means for guiding said probe along a path leading from said rest position to said reference plate, drive means with a regulating element operable in a first condition for moving said probe downward along said path from said rest position of said position and operable in a second condition to return said probe to said rest position, means connecting said probe to said regulating element to stop said probe and switch over said regulating element from said first condition to said second condition when said probe encounters said reference plate or said layer of fallen snow which reflects infrared emitter from said emitter into said receiver, means for generating electrical signals as a function of the downward distance travelled by said probe along said path, evaluating means receiving said electrical signals and operable for determining said distance and for calculating said thickness of said layer of fallen snow on said reference plate, and means for recording the calculated layer thickness.

17. The apparatus of claim 16 wherein said drive means includes a rotary shaft for moving said probe, and said means for generating electrical signals comprising pulse-generating means generating pulses in response to incremental rotation of said shaft, said evaluating means being operable to count the pulses generated during the movement of the probe between the rest position and its point of stopping.

18. The apparatus of claim 17 wherein said drive means regulating element is operable to move said probe in repetitive cycles from said rest position to said stopping position and back to said rest position, and said evaluating means includes a microprocessor having a memory to remember the distance travelled by said probe in one cycle for comparison with the distance travelled by said probe in a succeeding cycle.

19. The apparatus of claim 18 wherein said means for recording the calculated thickness includes an alarm connecte'd to said microprocessor to receive the calculated layer thickness, said alarm including a preselection device to generate an alarm signal when the calculated layer thickness exceeds a preselected amount.

20. The apparatus of claim 18 wherein said means for recording the calculated layer thickness includes a display device connected to said microprocessor to display the layer thickness.

* * * * *